(12) United States Patent
Liu

(10) Patent No.: US 11,359,761 B2
(45) Date of Patent: Jun. 14, 2022

(54) MULTIPURPOSE HOLDER

(71) Applicant: Kuo-Chen Liu, Puli Township (TW)

(72) Inventor: Kuo-Chen Liu, Puli Township (TW)

( * ) Notice: Subject to any disclaimer, the term of this patent is extended or adjusted under 35 U.S.C. 154(b) by 0 days.

(21) Appl. No.: 17/229,225

(22) Filed: Apr. 13, 2021

(65) Prior Publication Data

US 2021/0324994 A1 Oct. 21, 2021

(30) Foreign Application Priority Data

Apr. 15, 2020 (TW) .................................. 109112681

(51) Int. Cl.
*A47B 23/04* (2006.01)
*F16M 11/38* (2006.01)
*H04B 1/3877* (2015.01)

(52) U.S. Cl.
CPC ........... *F16M 11/38* (2013.01); *A47B 23/044* (2013.01); *H04B 1/3877* (2013.01)

(58) Field of Classification Search
USPC ....... 248/448, 449, 454, 455, 456, 457, 458, 248/460, 461, 463, 465
See application file for complete search history.

(56) References Cited

U.S. PATENT DOCUMENTS

| 8,464,995 | B2* | 6/2013 | Yang ....................... F16M 13/00 248/455 |
| D733,113 | S | 6/2015 | Krantz |
| D779,478 | S | 2/2017 | Justiss et al. |
| 2013/0214022 | A1* | 8/2013 | Harvey ................ F16M 11/041 224/623 |
| 2014/0151523 | A1* | 6/2014 | Subbaraman ........... B43L 5/025 248/449 |
| 2016/0273702 | A1* | 9/2016 | Shiba .................... F16M 13/005 |
| 2019/0038018 | A1* | 2/2019 | Hill ....................... F16M 13/022 |
| 2019/0326767 | A1* | 10/2019 | Fan ........................ H02J 7/0044 |

FOREIGN PATENT DOCUMENTS

| CN | 104456000 A | 3/2015 |
| CN | 205896609 U | 1/2017 |
| CN | 207230068 U | 4/2018 |
| TW | D192222 S | 8/2018 |
| TW | M569980 U | 11/2018 |
| TW | D203711 S | 4/2020 |

OTHER PUBLICATIONS

Search Report appended to an Office Action, which was issued to Chinese counterpart application No. 202010303969.1 by the CNIPA dated Nov. 3, 2021.
Search Report appended to an Office Action, which was issued to Chinese counterpart application No. 202010303969.1 by the CNIPA dated May 12, 2021, with an English translation thereof.

* cited by examiner

*Primary Examiner* — Alfred J Wujciak
(74) *Attorney, Agent, or Firm* — The Webb Law Firm

(57) ABSTRACT

A multipurpose holder includes a base seat having opposite first and second end portions, a support rod including a pivot end portion connected pivotally to the first end portion, and a detent member including a pivot connecting portion proximate to the second end portion, and a pressed portion and a connecting end portion located on two opposite sides of the pivot connecting portion. The support rod is movable between stored and propped-up positions, in which it abuts against the base seat and a free end portion thereof is distal to the base seat, respectively. The connecting end portion is movable between first and second positions, in which it is proximate and distal to the base seat, respectively.

7 Claims, 6 Drawing Sheets

MULTIPURPOSE HOLDER

CROSS-REFERENCE TO RELATED APPLICATION

This application claims priority to Taiwanese Patent Application No. 109112681 filed Apr. 15, 2020, the disclosure of which is hereby incorporated by reference in its entirety.

BACKGROUND OF THE INVENTION

Field of the Invention

The disclosure relates to a holder, more particularly to a multipurpose holder.

Description of Related Art

In recent years, the demand for electronic and peripheral products has greatly increased, such as a mobile phone holder which can support a mobile phone in a propped-up position and which can provide a user with a convenient way of watching the screen of the mobile phone. Taiwanese Patent Nos. D192222 and D203711 are some of the examples of mobile phone holders designed to position the mobile phone in a propped-up position.

A multifunctional stand for a mobile phone, as disclosed in Taiwanese Patent No. M569980, includes a phone holder body having a triangular shape. The phone holder body includes a first side plate, a second side plate, and a platform between top ends of the first and second side plates. The first side plate has a lower half that is bent outward to form a limiting platform for supporting a mobile phone. The second side plate has a lower half provided with a receiving grooved body for receiving a mobile phone. The platform is provided with a plurality of through holes.

Although the aforesaid mobile phone holders and stand can achieve the purpose of supporting and positioning the mobile phone, they cannot be folded to a stored position, so that they occupy a large space when not in use. Further, they can only be used to support the mobile phone and have no other usage.

SUMMARY OF THE INVENTION

Therefore, an object of the present disclosure is to provide a multipurpose holder that is capable of alleviating at least one of the drawbacks of the prior art.

Accordingly, a multipurpose holder of this disclosure comprises a base seat, a support rod, and a detent member. The base seat has opposite first and second end portions. The support rod includes a pivot end portion connected pivotally to the first end portion, a free end portion opposite to the pivot end portion, and at least one guide groove provided between the pivot end portion and the free end portion. The support rod is movable between a stored position, in which it abuts against the base seat, and a propped-up position, in which the free end portion is distal to the base seat.

The detent member is movably disposed below the support rod, and includes a pivot connecting portion connected pivotally to the base seat and proximate to the second end portion, a pressed portion located on one side of the pivot connecting portion, a connecting end portion located on the other side of the pivot connecting portion and opposite to the pressed portion, and a guide pin provided on the connecting end portion. The connecting end portion is movable between first and second positions, in which it is proximate and distal to the base seat, respectively. The guide pin is slidable along the at least one guide groove to guide movement of the connecting end portion from the first to the second position and vice versa. When the pressed portion is pressed, the connecting end portion moves from the first to the second position, and pushes the support rod to move from the storage position to the propped-up position.

BRIEF DESCRIPTION OF THE DRAWINGS

Other features and advantages of the disclosure will become apparent in the following detailed description of the embodiment with reference to the accompanying drawings, of which.

DESCRIPTION OF THE INVENTION

Figure 1:
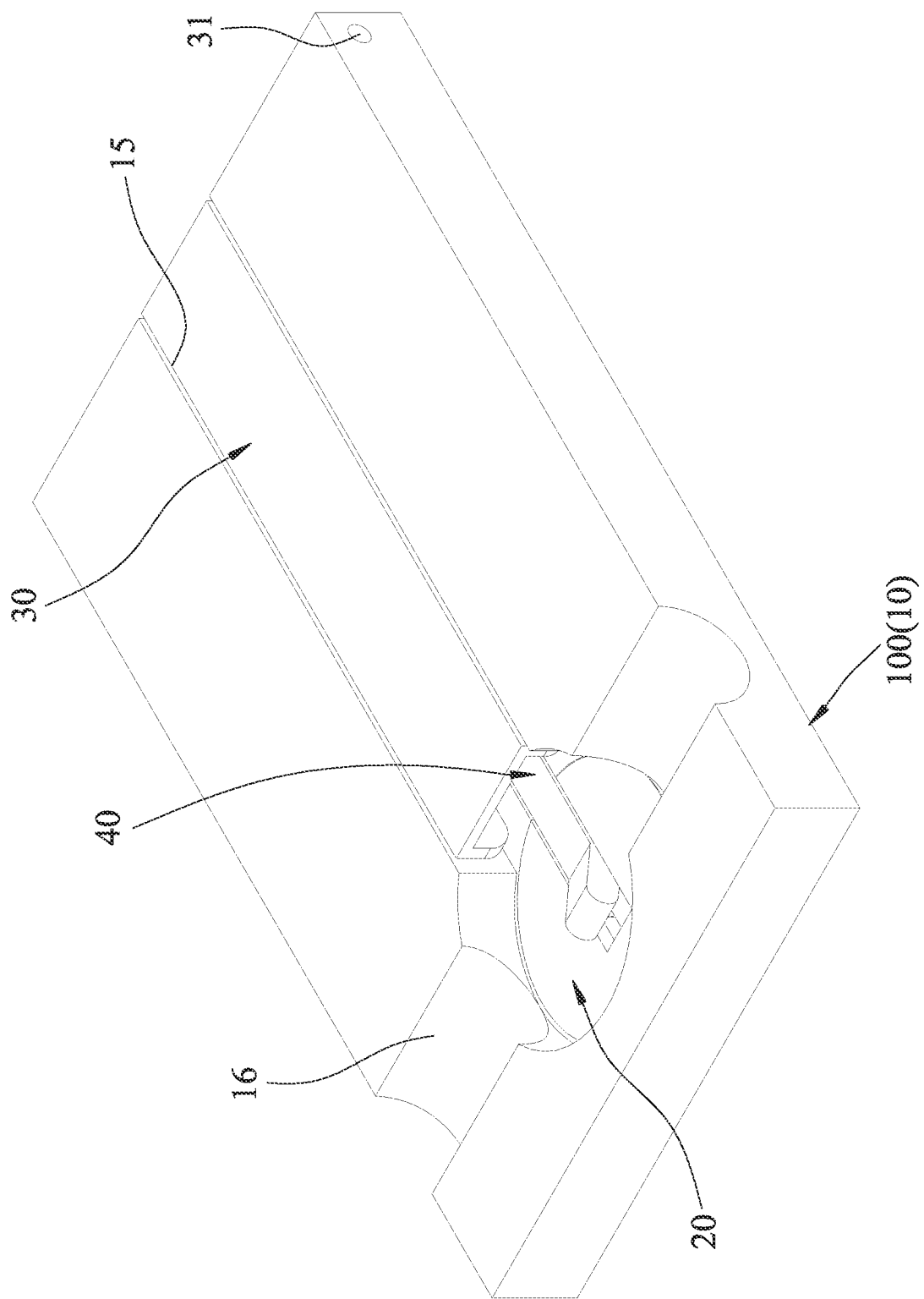
FIG. 1 is a perspective view of a multipurpose holder according to an embodiment of the present disclosure.
Figure 2:
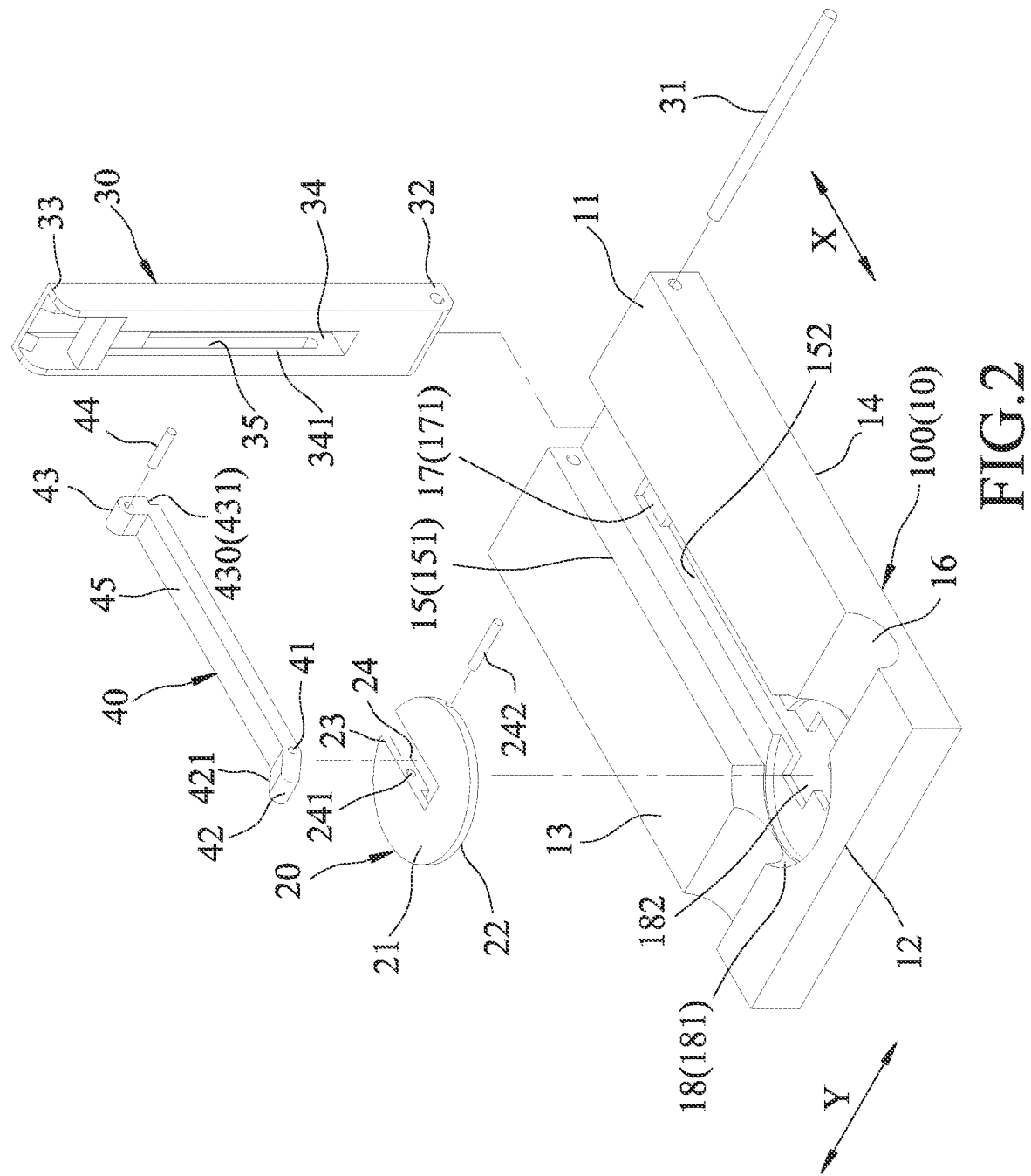
FIG. 2 is an exploded perspective view of the embodiment.
Figure 3:
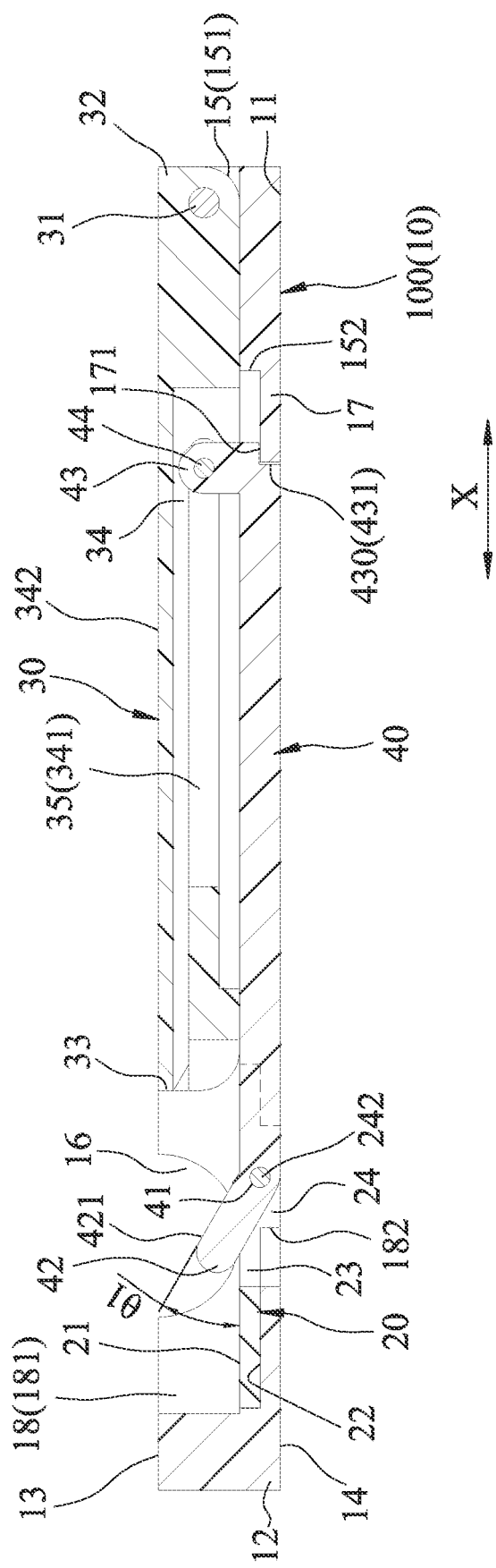
FIG. 3 is an assembled sectional view of the embodiment.

Referring to FIGS. 1 to 3, a multipurpose holder according to an embodiment of the present disclosure comprises a base seat 100, a support rod 30, and a detent member 40.

The base seat 100 includes a base body 10, and a positioning plate 20 mounted on the base body 10. The base body 10 has a rectangular shape, and has a first end portion 11, a second end portion 12 opposite to the first end portion 11 along a length direction (X) of the base body 10, a top surface 13 extending from the first end portion 11 to the second end portion 12, a bottom surface 14 opposite to the top surface 13, a main groove 15 extending inwardly from the top surface 13 and extending from the first end portion 11 toward the second end portion 12, two positioning grooves 16 extending inwardly from the top surface 13 in proximity to the second end portion 12 and spaced apart from each other in a width direction (Y) of the base body 10 transverse to the length direction (X), and an expansion groove 18 formed between the positioning grooves 16 and the main groove 15.

The main groove 15 has a main groove upper portion 151 adjacent to the top surface 13, and a main groove lower portion 152 adjacent to the bottom surface 14 and communicating with the main groove upper portion 151. The main groove upper portion 151 has a width in the width direction (Y) greater than that of the main groove lower portion 152. The expansion groove 18 has an expansion groove upper portion 181 that is formed between and communicating with said positioning grooves 16 and that communicates with said main groove upper portion 151, and an expansion groove lower portion 182 communicating with the expansion groove upper portion 181 and intersecting with the main groove lower portion 152 to form a cross shape, as shown in FIG. 2.

The base body 10 further has a blocking portion 17 proximate to the first end portion 11 and located in the main groove lower portion 152. The blocking portion 17 has a stop surface 171. A distance between the stop surface 171 and the bottom surface 14 is smaller than a depth of the main groove lower portion 152.

The positioning plate 20 is mounted in the expansion groove upper portion 181, and has an upper surface 21, a lower surface 22 opposite to the upper surface 22, a radially extending notch 23 extending through the upper and lower surfaces 21, 22 and communicating with the expansion groove upper and lower portions 181, 182 and the main groove 15, and a pair of pivot portions 24 located on two opposite sides of the notch 23 and inserted into the expansion groove lower portion 182. Each pivot portion 24 has a pivot hole 241. A pivot pin 242 is inserted between the pivot holes 241 of the pivot portions 24.

Figure 4:
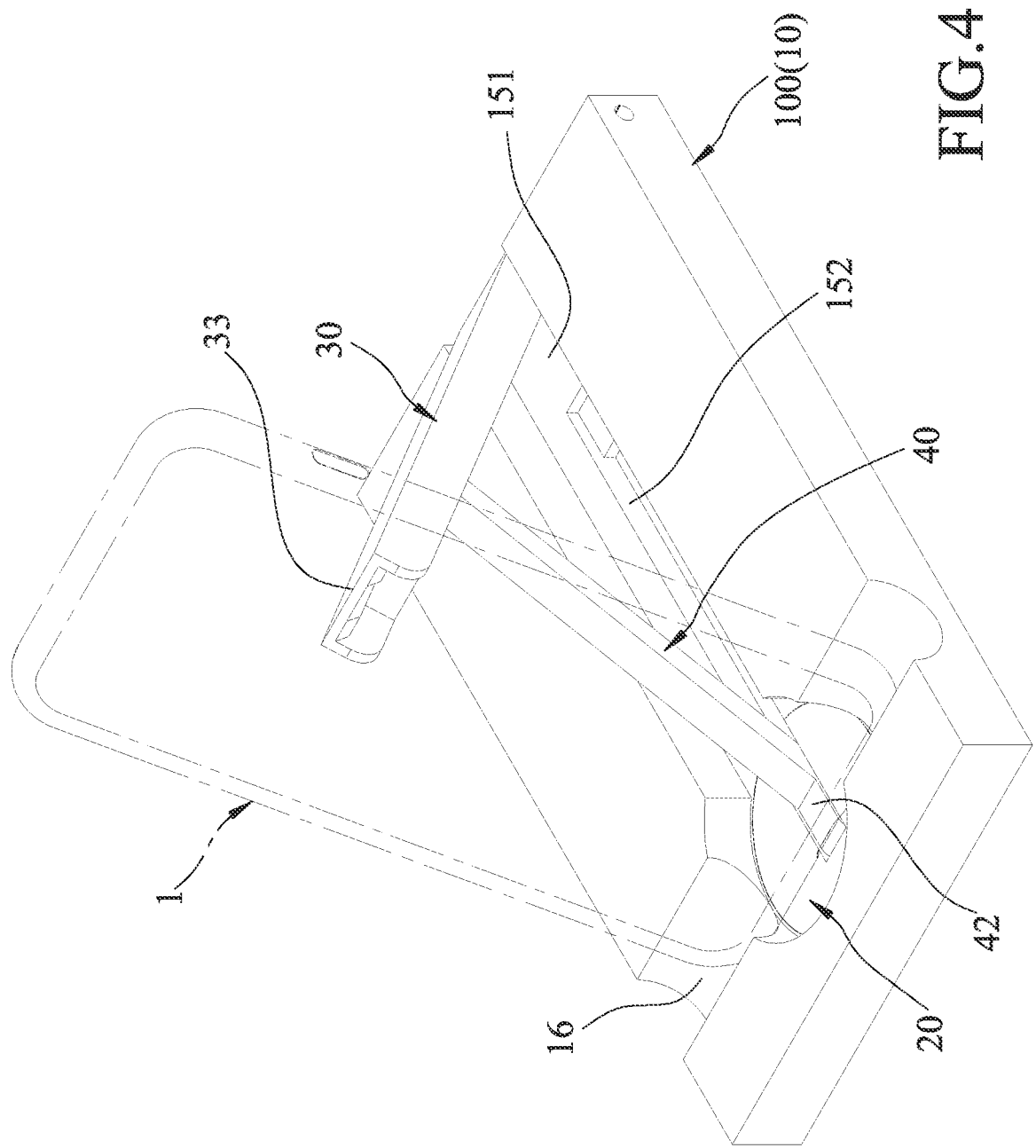
FIG. 4 is a view similar to FIG. 1, but illustrating the embodiment in a state of use.
Figure 5:
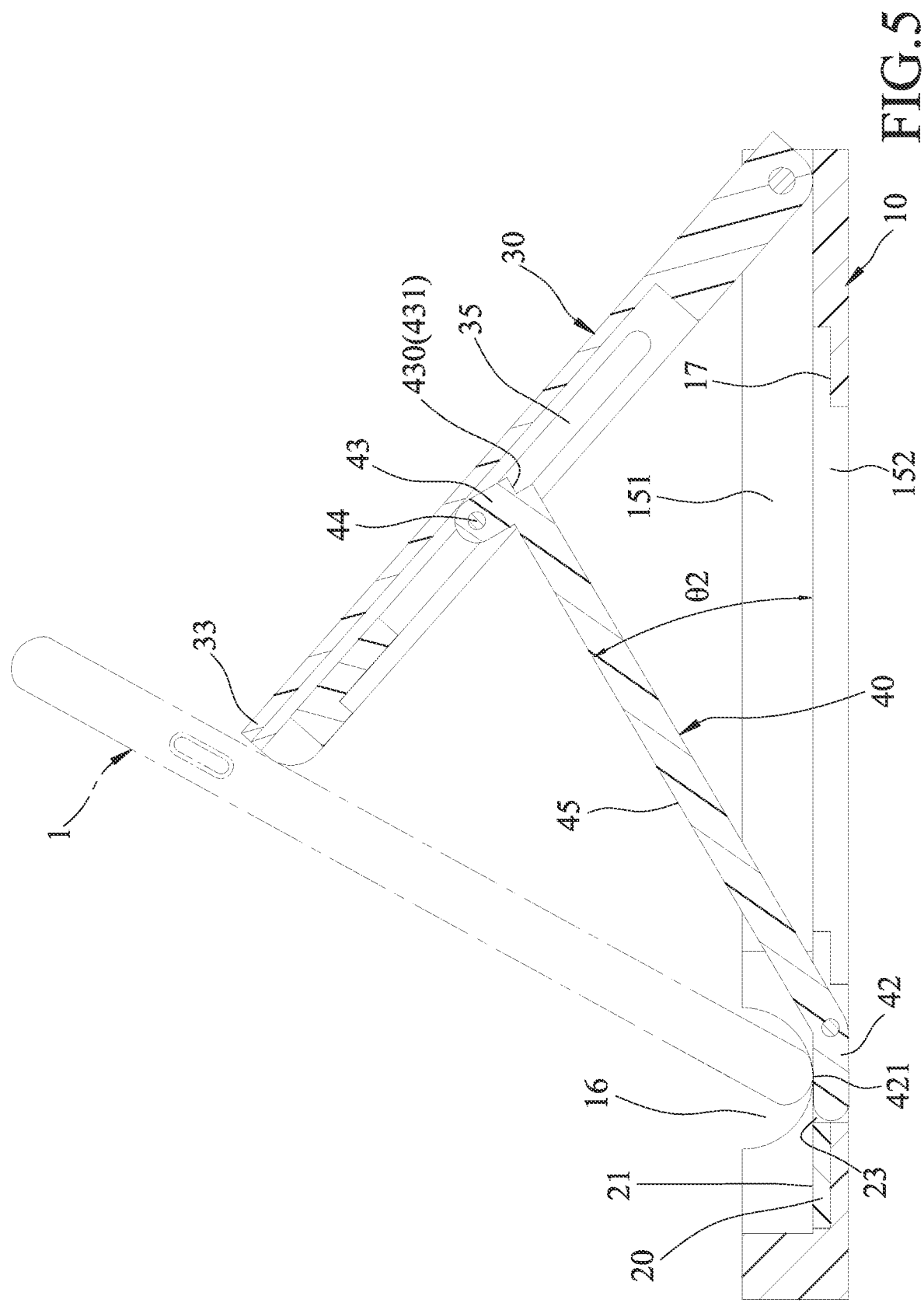
FIG. 5 is a sectional view of FIG. 4.

The support rod 30 is pivoted to the base body 10, and includes a pivot end portion 32 connected pivotally to the first end portion 11 by a pivot rod 31, a free end portion 33 opposite to the pivot end portion 32, an elongated groove 34 that is located between the pivot end portion 32 and the free end portion 33 and that is defined by two groove sidewalls 341 (only one is visible in FIG. 2) and a groove base wall 342 (see FIG. 3) extending between the groove sidewalls 341, and two elongated guide grooves 35 (only one is visible in FIG. 2) respectively formed in the groove sidewalls 341 and communicating with the groove 34. The support rod 30 is movable between a folded or stored position and a use or propped-up position. In the stored position, the support rod 30 is received in and abuts against a groove wall of the main groove upper portion 151, as shown in FIGS. 1 and 3. In the propped-up position, the free end portion 33 of the support rod 30 is moved away from the main groove upper portion 151 and is distal to the base body 10, as shown in FIGS. 4 and 5.

The detent member 40 is pivoted to the positioning plate 20, and includes a pivot connecting portion 41 connected pivotally between the pivot portions 24 by the pivot pin 242, a pressed portion 42 located on one side of the pivot connecting portion 41, a connecting end portion 43 located on the other side of the pivot connecting portion 41 and opposite to the pressed portion 42, a guide pin 44 provided on the connecting end portion 43, and a top side surface 45 extending from the pivot connecting portion 41 to the connecting end portion 43. The pressed portion 42 has a pressed surface 421 forming an obtuse angle with the top side surface 45.

The connecting end portion 43 forms a 90-degree angle with the top side surface 45, and has a bottom end 430 recessed to form a right-angled groove 431. The bottom end 430 is abuttable against the blocking portion 17. The connecting end portion 43 is movable between a first position, in which it is proximate to the base body 10 and the bottom end 430 abuts against the blocking portion 17, as shown in FIG. 3, and a second position, in which it is distal to the base body 10, as shown in FIGS. 4 and 5. The guide pin 44 has two opposite ends disposed respectively and slidably in the guide grooves 35 to guide movement of the connecting end portion 43 from the first position to the second position and vice versa.

With reference to FIG. 3, the multipurpose holder of this embodiment is in a stored position. At this time, the support rod 30 is received in the main groove upper portion 151, while the detent member 40 is received in the main groove lower portion 152. Specifically, the free end portion 33 of the support rod 30 is in the stored position, and the connecting end portion 43 of the detent member 40 is in the first position. Further, the pressed portion 42 protrudes from the upper surface 21 of the positioning plate 20, and corresponds to the expansion groove upper portion 181. The pressed surface 421 of the pressed portion 42 forms a first included angle (θ1) with the upper surface 21. The first included angle (θ1) is less than 90 degrees. In this embodiment, the first included angle (θ1) is 30 degrees. The multipurpose holder of this embodiment has the smallest volume in this position.

When an object 1, such as a mobile phone shown in FIGS. 4 and 5 or a tablet (not shown), is placed by a user in the expansion groove upper portion 181 of the base body 10 with two sides of the object 1 extending respectively into the positioning grooves 16, the object 1 presses down the pressed portion 42 of the detent member 40 so that the pressed portion 42 moves down into the notch 23. As the pressed portion 42 moves downward, the connecting end portion 43 of the detent member 40 moves upward and out of the main groove lower portion 152 to shift from the first position to the second position. Simultaneously, the support rod 30 is pushed out of the main groove upper portion 151 by the connecting end portion 43 to move from the storage portion to the propped-up position, and abuts against the object 1. During movement of the connecting end portion 43 from the first position to the second position, the guide pin 44 slides along the guide grooves 35 until the pressed surface 421 of the pressed portion 42 is flush with the upper surface 21 of the positioning plate 20, as shown in FIG. 5. At this time, the topside surface 45 of the detent member 40 forms a second included angle (θ2) with the upper surface 21 of the positioning plate 20. In this embodiment, the second included angle (θ2) is equal to the first included angle (θ1), and is 30 degrees.

When the object 1 is took away by the user and is removed from the base body 10, the pressed portion 42 of the detent member 40 is released from being pressed by the object 1, and under the action of gravity, the connecting end portion 43 of the detent member 40 moves down toward the base body 10 until the bottom end 430 thereof abuts against the blocking portion 17. Simultaneously, the support rod 30 is pulled by the detent member 40, so that the free end portion 33 of the support rod 30 is moved from the propped-up position to the stored position, as shown in FIGS. 1 and 3. At this time, the pressed portion 42 is moved away from the notch 23 and protrudes from the upper surface 21 of the positioning plate 20.

Figure 6:
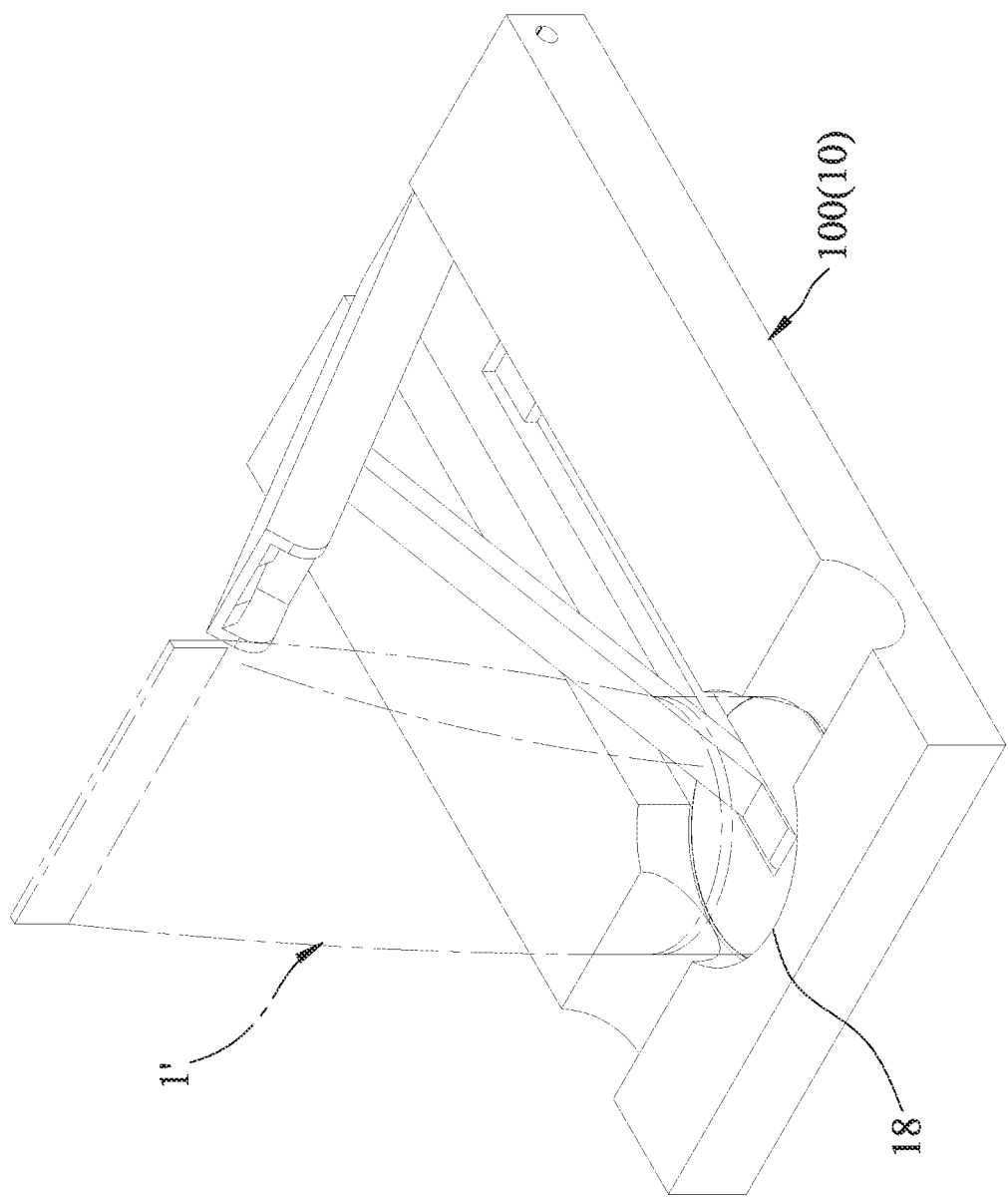
FIG. 6 is a view similar to FIG. 1, but illustrating the embodiment in another state of use.

Referring to FIG. 6, the multipurpose holder of this disclosure, in addition for placing of the mobile phone or the tablet thereto, the expansion groove 18 of the base body 10 of the base seat 100 can also be used to receive an object 1' with a rounded end, such as a toothpaste, a facial wash, etc. The effects of automatic propping up and automatic folding can also be achieved.

In summary, the multipurpose holder of this disclosure has a simple overall structure, and the operation thereof from the stored position to the propped-up position, and vice versa, is relatively easy. Therefore, the object of this disclosure can indeed be achieved.

While the disclosure has been described in connection with what is considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A multipurpose holder comprising:
   a base seat having a first end portion and a second end portion opposite to said first end portion;
   a support rod including a pivot end portion connected pivotally to said first end portion, a free end portion opposite to said pivot end portion, and at least one guide groove provided between said pivot end portion and said free end portion, said support rod being movable between a stored position, in which said support rod abuts against said base seat, and a propped-up position, in which said free end portion is distal to said base seat; and a detent member movably disposed below said support rod and including a pivot connecting portion connected pivotally to said base seat and proximate to said second end portion, a pressed portion located on one side of said pivot connecting portion, a connecting end portion located on the other side of said pivot connecting portion and opposite to said pressed portion, and a guide pin provided on said connecting end portion, said connecting end portion being movable between a first position, in which said connecting end portion is proximate to said base seat, and a second position, in which said connecting end portion is distal to said base seat, said guide pin being slidable along said at least one guide groove to guide movement of said connecting end portion from said first position to said second position and vice versa;

wherein, when said pressed portion is pressed, said connecting end portion moves from said first position to said second position, and pushes said support rod to move from said stored position to said propped-up position.

2. The multipurpose holder as claimed in claim 1, wherein said base seat further has a top surface, a bottom surface opposite to said top surface, and a main groove extending inwardly from said top surface and extending from said first end portion toward said second end portion, and wherein, said support rod is received in said main groove when in said stored position, and said detent member is received in said main groove below said support rod when said connecting end portion is in said first position.

3. The multipurpose holder as claimed in claim 2, wherein said main groove has a main groove upper portion adjacent to said top surface of said base seat, and a main groove lower portion adjacent to said bottom surface of said base seat and communicating with said main groove upper portion, and wherein, said support rod is received in said main groove upper portion when in said stored position, and said detent member is received in said main groove lower portion when said connecting end portion is in said first position.

4. The multipurpose holder as claimed in claim 3, wherein said base seat further has two-spaced-apart positioning grooves extending inwardly from said top surface of said base seat in proximity to said second end portion.

5. The multipurpose holder as claimed in claim 4, wherein:

said base seat further has an expansion groove, said expansion groove having an expansion groove upper portion that is formed between and communicating with said positioning grooves and that communicates with said main groove upper portion, and an expansion groove lower portion communicating with said main groove lower portion and said expansion groove upper portion;

said base seat includes a positioning plate mounted in said expansion groove upper portion, said positioning plate having a radially extending notch communicating with said expansion groove upper portion, said expansion groove lower portion and said main groove, and a pair of pivot portions located on two opposite sides of said radially extending notch;

said pivot connecting portion is pivoted to said pair of pivot portions by a pivot pin; and said pressed portion is movable relative to said radially extending notch, said pressed portion moving out of said radially extending notch and protruding from said positioning plate when said connecting end portion is in said first position, and moving into said radially extending notch when said connecting end portion is in said second position.

6. The multipurpose holder as claimed in claim 3, wherein said base seat further has a blocking portion proximate to said first end portion and located in said main groove lower portion, said blocking portion having a stop surface, and wherein, a distance between said stop surface and said bottom surface of said base seat is smaller than a depth of said main groove lower portion, said connecting end portion having a bottom end recessed to form a right-angled groove, said bottom end of said connecting end portion abutting against and blocked by said blocking portion when said connecting end portion is in said first position.

7. The multipurpose holder as claimed in claim 1, wherein:

said pressed portion has a pressed surface that forms a first included angle with an upper surface of said positioning plate of less than 90 degrees when said connecting end portion is in said first position and that is flush with said upper surface of said positioning plate when said connecting end portion is in said second position; and said detent member further includes a top side surface extending from said pivot connecting portion to said connecting end portion, said top side surface forming a second included angle with an extension of said upper surface of said positioning plate, said second included angle being equal to said first included angle.

* * * * *